United States Patent [19]

May

[11] Patent Number: 4,729,455
[45] Date of Patent: Mar. 8, 1988

[54] WHEEL ASSEMBLY AND BRAKE THEREFOR

[75] Inventor: Colin C. May, Kingston, Canada

[73] Assignee: Urban Transportation Development Corporation Ltd., Toronto, Canada

[21] Appl. No.: 761,834

[22] Filed: Aug. 2, 1985

[51] Int. Cl.[4] .................. B61H 13/00; B60T 11/00; B60T 1/02; F16D 19/00

[52] U.S. Cl. .................... 188/58; 188/370; 192/85 AA; 295/39; 295/36.1; 301/6 E; 301/126

[58] Field of Search .................. 188/18 A, 19, 28, 29, 188/57, 58, 59, 71.1, 72.4, 107, 153 R, 218 XL, 161, 2 R, 370; 295/36 R, 37, 39, 38; 301/6 S, 6 W, 124 R, 125, 6 E, 126, 36 A; 180/76, 24, 24.03; 105/182 R; 192/85 AA

[56] References Cited

U.S. PATENT DOCUMENTS

| 263,083 | 8/1882 | Woolson | 188/59 |
|---|---|---|---|
| 352,411 | 11/1886 | James | 295/39 |
| 352,761 | 11/1886 | Krengel | 295/39 |
| 361,391 | 4/1887 | Bates | 295/39 |
| 366,872 | 7/1887 | Pettinger | 295/39 |
| 641,600 | 1/1900 | Mercader | 295/36 |
| 1,564,628 | 12/1925 | Rowe | 295/40 |
| 1,802,259 | 4/1931 | Klein | 295/36 |
| 2,180,092 | 11/1939 | Oelkers | 188/59 |
| 2,213,383 | 9/1940 | Canfield | 188/2 R |
| 2,440,020 | 4/1948 | Pratt | 188/59 |
| 2,620,235 | 12/1952 | Butler | 301/36 A |
| 3,207,251 | 9/1965 | Putnam et al. | 180/76 |
| 3,344,893 | 10/1967 | Pelikan | 188/58 |
| 3,795,408 | 3/1974 | Nemessanyi | 301/126 X |
| 3,802,352 | 4/1974 | Keller | 295/37 |
| 3,902,581 | 9/1975 | Knudsen | 188/161 X |
| 4,258,629 | 3/1981 | Jackson et al. | 188/58 |
| 4,444,120 | 4/1984 | Bille | 295/36 R X |
| 4,461,207 | 7/1984 | Girod et al. | 105/182 R |

FOREIGN PATENT DOCUMENTS 229465  11/1985  German Democratic Rep. ... 192/85 AA

Primary Examiner—Andres Kashnikow
Assistant Examiner—Robert J. Oberleitner
Attorney, Agent, or Firm—Spencer & Frank

[57] ABSTRACT

The invention provides a wheel assembly consisting of first and second spaced apart coaxial wheels. The wheel are mounted on a support structure such that they can rotate relative to one another. A first brake rotor is non-rotatably connected to the first wheel, and a second brake rotor is non-rotatably connected to the second wheel. A brake stator is operable on each rotor to oppose rotation of the two brake rotors simultaneously.

6 Claims, 2 Drawing Figures

WHEEL ASSEMBLY AND BRAKE THEREFOR

BACKGROUND OF THE INVENTION

The present invention relates to an wheel assembly, and more specifically to a wheel assembly and a brake therefor.

Structures having two coaxial wheels, one of which is rotatable relative to the other to prevent slip or skid of the wheels when negotiating a curve, are known in the prior art.

It is known to use a separate brake for each wheel. This braking arrangement has the disadvantages of providing uneven braking, which causes wheel-wear, and of causing variances in wheel rotation measurements during braking, which are used in automatic vehicle control.

It is an object of the present invention to obviate or mitigate the above-mentioned disadvantages.

SUMMARY OF THE INVENTION

Accordingly, the invention provides a wheel assembly consisting of first and second spaced apart coaxial wheels. The wheels are mounted on a support structure such that they can rotate relative to one another. A first brake rotor is non-rotatably connected to the first wheel, and a second brake rotor is non-rotatably connected to the second wheel. A brake stator is operable on each rotor to oppose rotation of the two brake stators simultaneously.

With the braking arrangement of the present invention, wherein braking of both wheels occurs simultaneously, uneven braking of the wheels and the associated wheel-wear problems are avoided. Also, automatic vehicle control, employing wheel rotation for distance measurement, will not be adversely affected by variances resulting from individual braking of wheels on the free wheeling axle.

BRIEF DESCRIPTION OF THE DRAWINGS

A preferred embodiment of the invention will now be described, by way of example only, with reference to the following drawings, in which.

DETAILED DESCRIPTION

Figure 1:
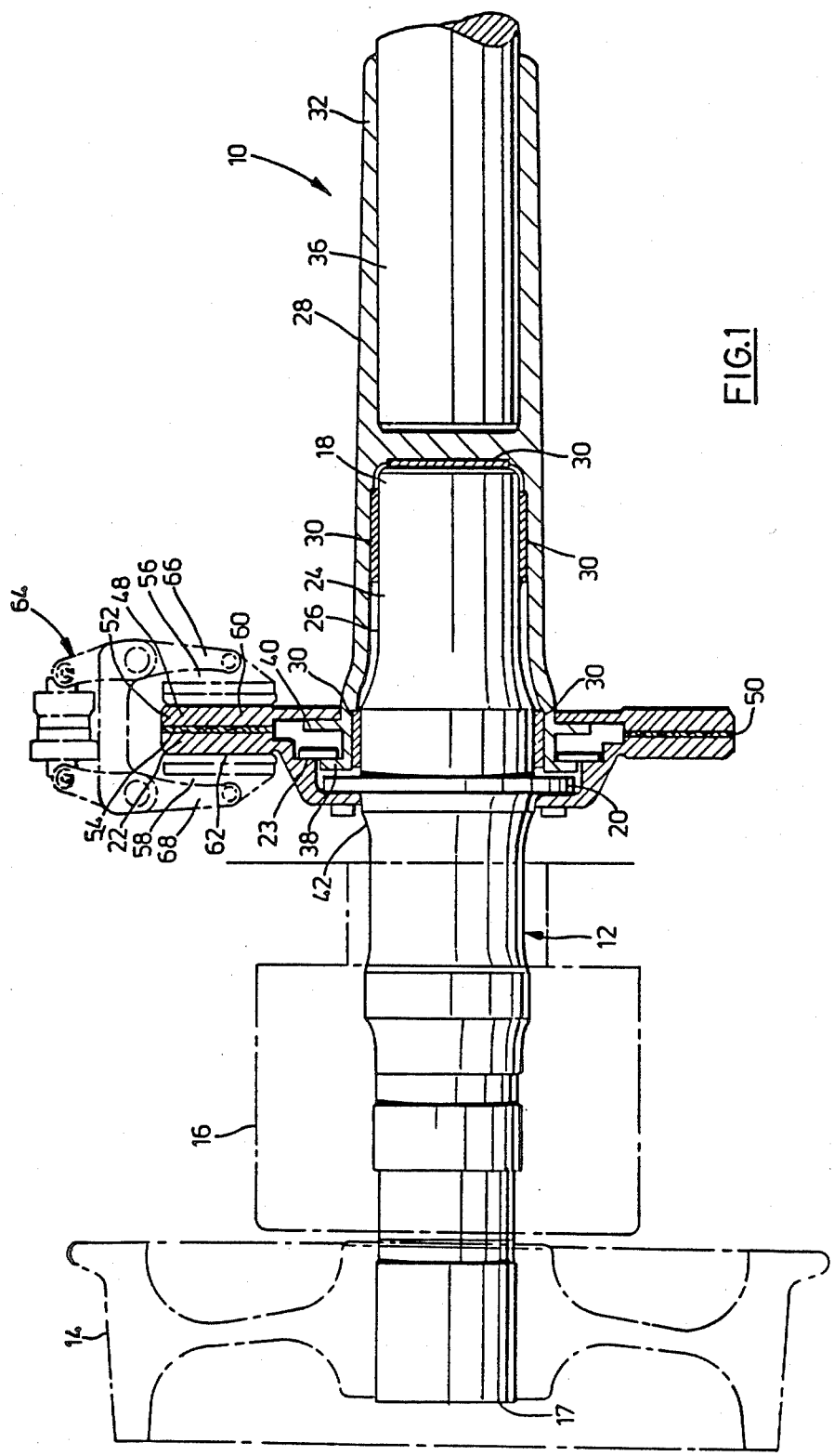
FIG. 1 is a cross-sectional side view of one side of the free wheeling axle and brake.
Figure 2:
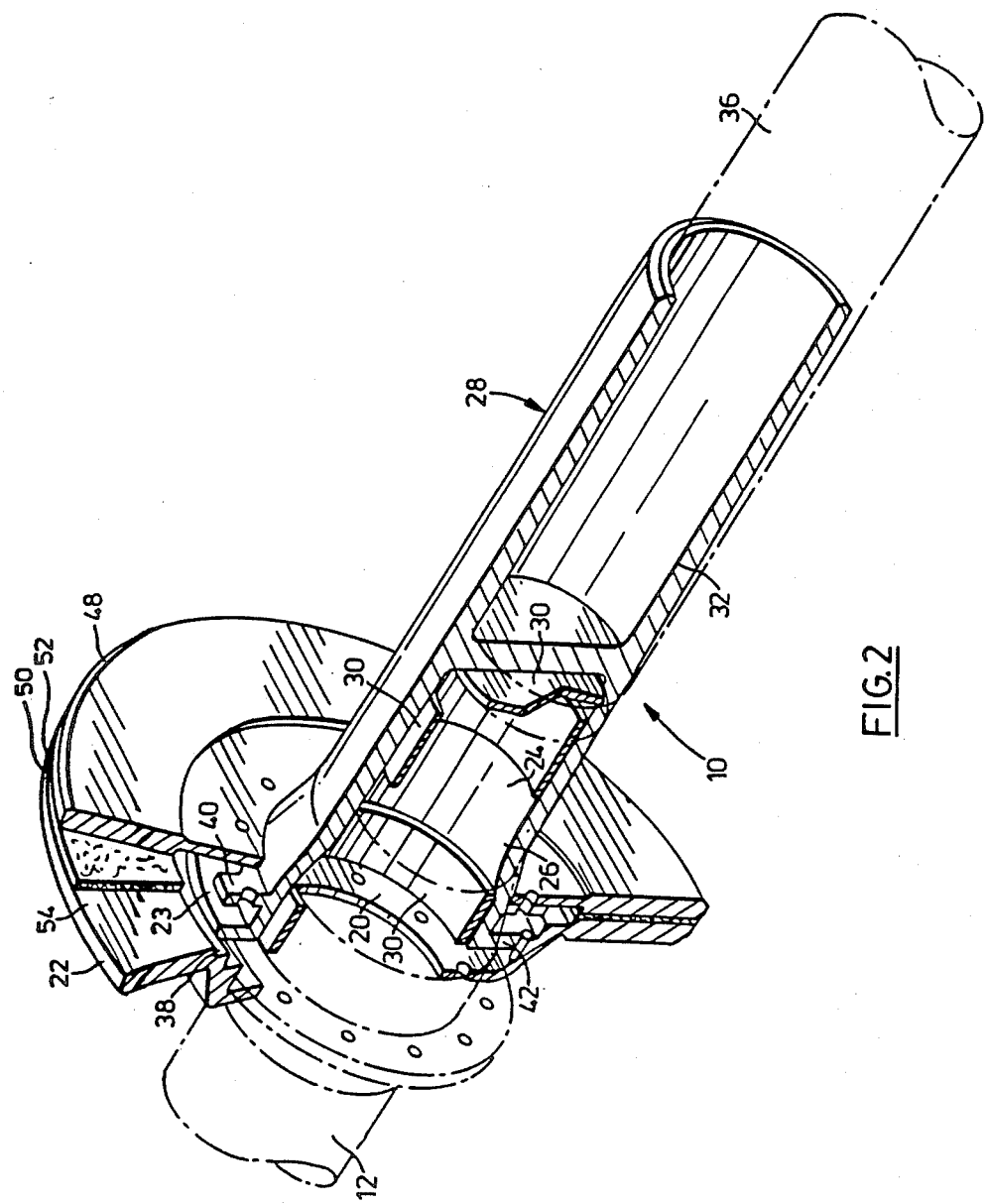
FIG. 2 is a broken perspective view of one side of the free wheeling axle and brake of FIG. 1 with exploded perspective views of some of the parts.

Referring to FIGS. 1 and 2, it can been seen that the axle and brake 10 consist of a first stub axle 12, having a wheel 14 (shown in ghost outline in FIG. 1) mounted on its outboard end 17 and being supported in a bearing assembly 16 (shown in ghost outline in FIG. 1) attached to the frame of a vehicle (not shown). About halfway between its outboard end 17 and its inboard end 18, the stub axle 12 has a flange 20 on which is mounted a first annular brake disk 22, attached to which is a split retaining ring 23. The stub axle 12 has a spigot 24 at its inboard end 18 which extends into a hollow recess 26 in a housing 28. Plain bearings 30 are provided between the spigot 24 and the housing 28.

The housing 28 has a second recess 32 at its other end 34 (not shown) into which is press fitted a second stub axle 36. The housing also has a pair of flanges 38, 40 on one end 42 of the housing 28. The first of these flanges 38 is flush with the end 42 of the housing 28 and the second of these flanges 40 is spaced from the end 42. The split retaining ring 23 is engageable with the first flange 38 such that the flange 38 and ring 23 are rotatable relative to one another to locate the brake disk axially.

A second brake disk 48 is mounted on the second flange 40. A ferrobestos disk 50 is located between the two opposed sides 52, 54 of the brake disks 22, 48 so that relative motion can occur between the disks without severe wear. A brake caliper 64 is attached to the frame of the vehicle and has a pair of caliper arms 66, 68 which are located on opposite sides 60, 62 of the brake disks. Brake pads 56, 58 are carried by the caliper 64 between the arms 66, 68 and the disks 22, 48.

The operation of the free wheeling axle 10 will now be described with reference to the drawings. When the brake caliper 64 is not actuated, the first stub axle 12 and the housing 28 and second stub axle 36 can rotate relative to one another, so that curves can be negotiated. The first stub axle 12 is located axially relative to the housing by the split retaining ring 23 which engages with the first flange 38 such that it is rotatable relative thereto.

During braking, the brake pads 56, 58 act against the brake disks, 22, 48 to brake both stub axles 12, 36 simultaneously.

It is to be appreciated that changes can be made to the free wheeling axle and brake 10 within the scope of the invention as described and claimed. The free wheeling axle can have a different configuration, i.e.—both axles 12, 36 may be rotatable relative to the housing 28. In this case the brake disks would be mounted on both of the axles rather than on one axle and the housing. Alternatively, one wheel may be rotatable relative to an axle, in which case one brake disk would be mounted on a flange on the wheel and the other disk on the axle.

The scope of the invention is limited only by the scope of the claims appended hereto.

I claim:

1. A wheel assembly, said wheel assembly comprising an axle having two coaxial portions, said portions having wheels fixedly mounted on ends thereof for rotation therewith and said portions being rotatable relative to each other, and a brake, said brake comprising:
   a first brake rotor mounted on one of said portions of said axle for rotation therewith;
   a second brake rotor mounted on the other of said portions of said axle adjacent to said first braking rotor for rotation therewith, said first and second brake rotors being in face to face sliding engagement; and
   a common stator disposed on either side of said first and second brake rotors and operable upon each rotor simultaneously to bring said rotors into frictional substantially non-sliding engagement to provide synchronous retardation of rotation thereof.

2. A wheel assembly as claimed in claim 1 wherein said first brake rotor and said second brake rotor each comprise a brake disk, said brake disks being mounted on respective portions of said axle such that they are rotatable therewith, said disks having opposed inner surfaces and outer surfaces.

3. A wheel assembly as claimed in claim 2 wherein said brake stator comprises a caliper which closes to act on said outer surfaces of both of said disks during braking to oppose rotation thereof simultaneously.

4. A wheel assembly as claimed in claim 1 wherein said axle comprises:
- a housing having two hollow recesses at respective ends thereof;
- a free axle, one end of which is held in one of said hollow recesses at one end of said housing and the other end of which has a wheel mounted thereon;
- bearing means acting between said free axle and said housing to allow for rotation of said free axle relative to said housing;
- retaining means mounted on said free axle and slidably engageable with said housing, to locate axially the free axle relative to said housing; and
- a fixed axle non-rotatably held in the other of said hollow recesses at the other end of said housing such that it is coaxial with said free axle.

5. A wheel assembly as claimed in claim 4 wherein the housing has a reaction surface at said one end with which said retaining means is slidably engageable.

6. A wheel assembly as claimed in claim 5 wherein said retaining means comprises a split retaining ring connected to said braking disk on said free axle.

* * * * *